United States Patent [19]

Day

[11] 4,010,974
[45] Mar. 8, 1977

[54] MULTIPLE COMPARTMENT STRUCTURE

[76] Inventor: Donald F. Day, 9213 Tamarind, Fontana, Calif. 92335

[22] Filed: Oct. 4, 1974

[21] Appl. No.: 511,993

Related U.S. Application Data

[63] Continuation of Ser. No. 350,515, April 12, 1973, abandoned.

[52] U.S. Cl. .............................................. 296/24 C
[51] Int. Cl.² .......................................... B60P 3/04
[58] Field of Search ............ 296/24 C, 24; 119/15, 119/19, 11, 17; 52/227 52/236

[56] References Cited

UNITED STATES PATENTS

| | | | |
|---|---|---|---|
| 1,160,728 | 11/1915 | Liggett | 256/24 |
| 3,588,166 | 6/1971 | Day | 119/15 X |

*Primary Examiner*—Stanley H. Tollberg
*Assistant Examiner*—Norman L. Stack, Jr.
*Attorney, Agent, or Firm*—John H. Crowe; Jess M. Roberts

[57] ABSTRACT

A truck to haul live poultry has compartments arranged in horizontal rows and vertical tiers, there being two rows of tiers opening onto the opposite sides respectively of the truck. The walls of the compartments are formed by wall members incorporating vertical tubes and the floors and ceilings are formed by horizontal panels. Vertical rods extend upward from the truck bed through the horizontal panels and through the vertical tubes of the wall members to form a unified structure. The invention teaches that the number of vertical rods required may be minimized by employing special brackets to anchor the wall members and/or by making some wall members angular instead of linear. The number of vertical rods required for a horizontal row of N number of vertical tiers of compartments is reduced to 2N + 2.

6 Claims, 12 Drawing Figures

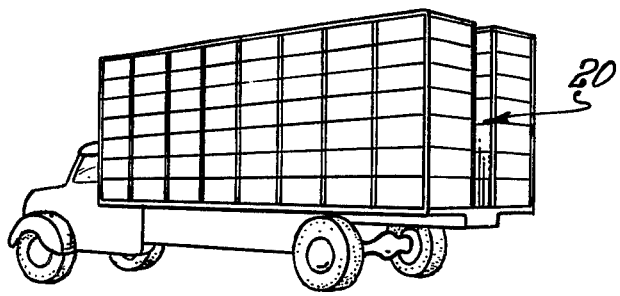
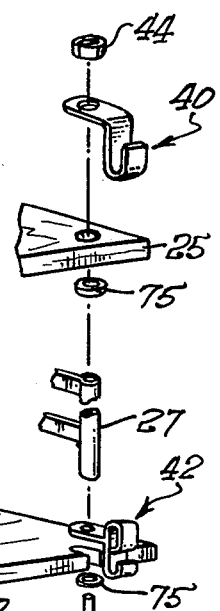
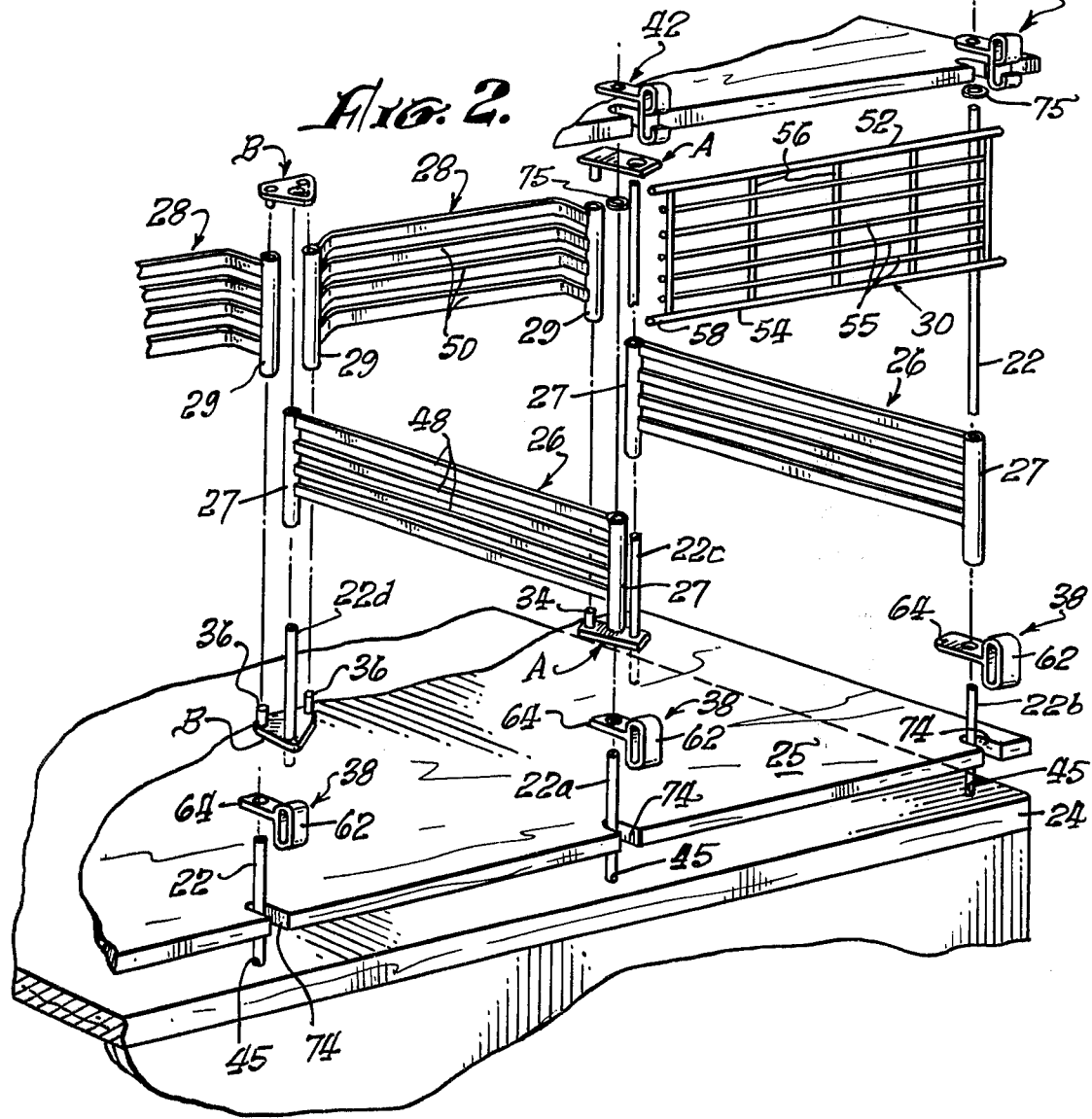

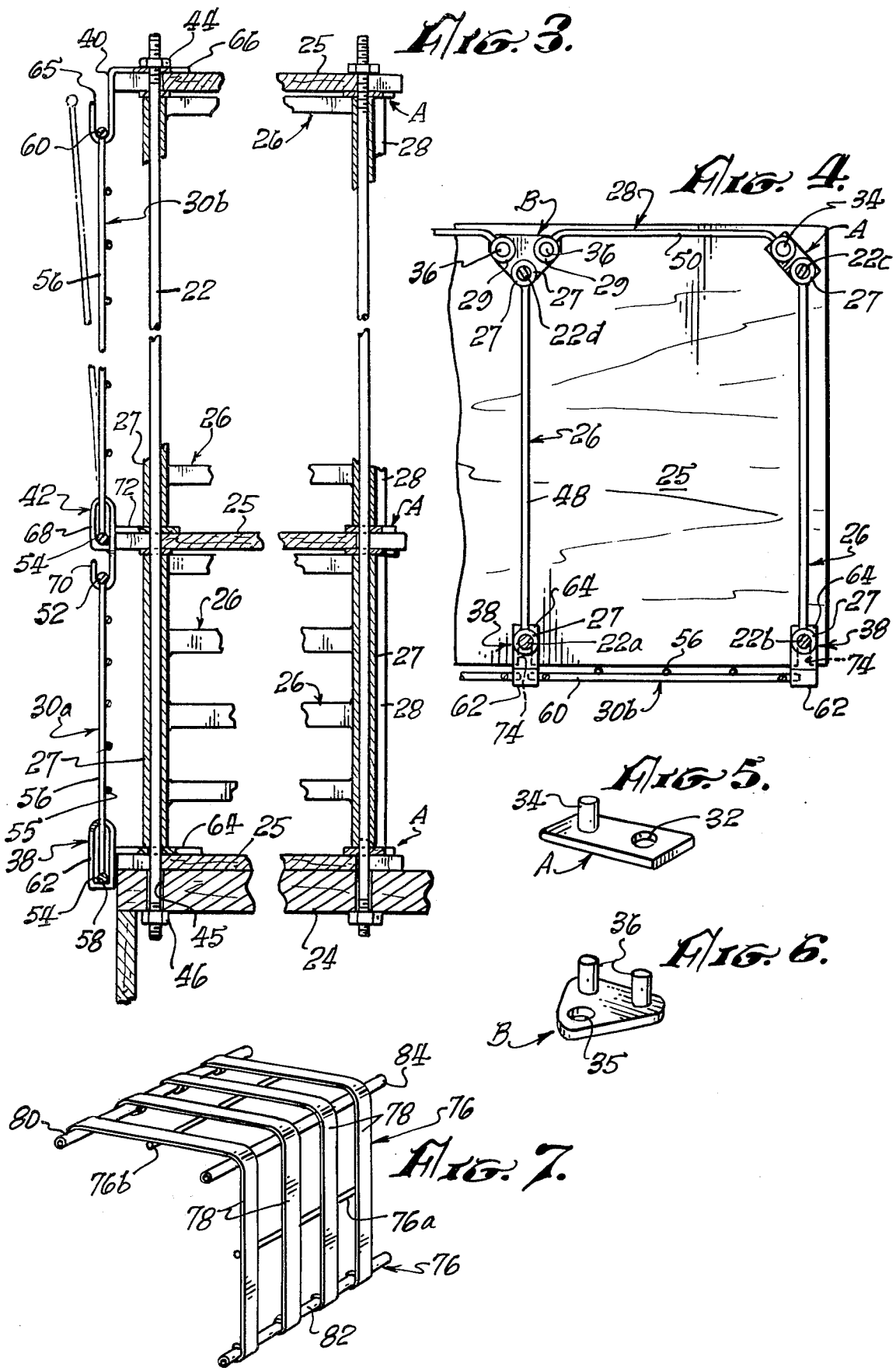

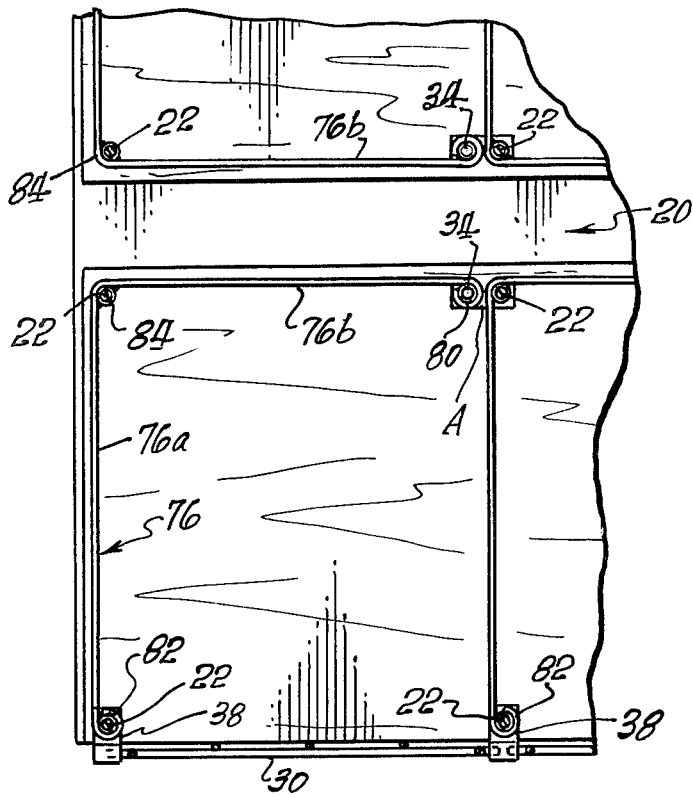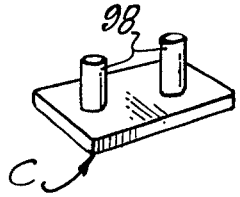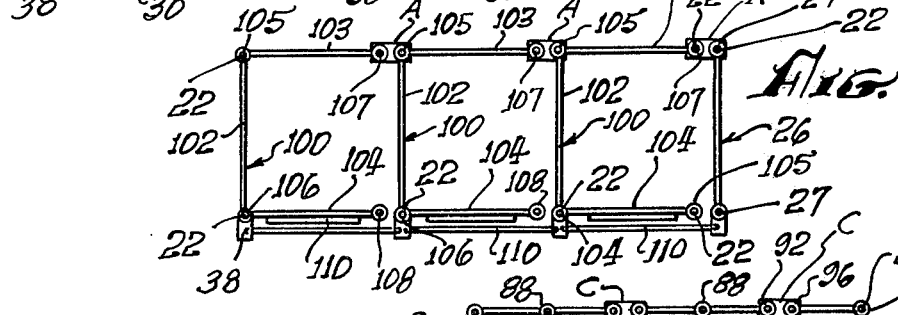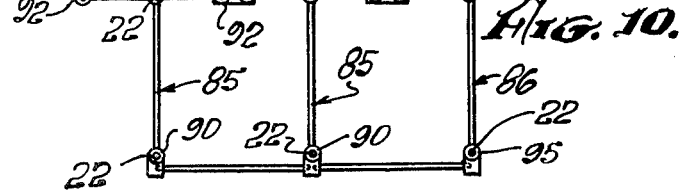

MULTIPLE COMPARTMENT STRUCTURE

This is a continuation of application Ser. No. 350,515, filed Apr. 12, 1973, now abandoned.

BACKGROUND OF THE INVENTION

Trucks are commonly provided with tiers or compartments for the transportation of live poultry. For example, a truck may be provided with two longitudinal rows of ten vertical tiers of compartments with doors that open outward onto the opposite sides of the truck. The present invention relates to a multiple compartment structure for trucks of the character set forth in my U.S. Pat. No. 3,588,166 issued June 28, 1971 and entitled MULTIPLE COMPARTMENT STRUCTURE FOR TRUCKS, which patent is hereby incorporated into the present disclosure by reference.

In a multiple compartment structure of this type horizontal panels form the floors and ceilings of the compartments and the walls of the compartments are formed by wall members that incorporate vertical tubes. Vertical rods extend upward from the truck bed through the horizontal panels and through the vertical tubes of the wall members to form a unified structure that is advantageous because it may be assembled to a truck bed in a relatively short time wholly by unskilled workmen and because the structure may be dismantled at the end of a hauling season to permit the truck to be used for other purposes. A further special advantage is that the multiple compartment structure may be readily sterilized thoroughly to prevent the spreading of poultry diseases.

The outer open end of each compartment is closed by a door and the two opposite side walls and the back wall of each compartment are formed by wall members that incorporate vertical tubes for engagement by the vertical rods. In the structure disclosed in the aforesaid prior patent, each of two opposite side wall members of a compartment incorporates two vertical tubes at its opposite ends of engagement by the vertical rods and a back wall member of the compartment also incorporates two vertical tubes at its opposite ends for engagement by the vertical rods. Since each two successive compartments in a horizontal row of compartments have a common side wall with an additional side wall at one end of the row of compartments, four vertical rods are required for each tier in a horizontal row of tiers and two additional horizontal rods are required at the end of the row so that the number of vertical rods required for a horizontal row of N tiers is 4N+2. Thus, a horizontal row of 10 tiers of compartments would require 42 rods in the structure set forth in the above patent.

SUMMARY OF THE INVENTION

A primary object of the present invention is to reduce both the material cost and the labor cost of constructing such a multiple compartment structure as well as to reduce the cost of disassembling and reassembling such a structure. The invention teaches that this object may be attained by employing special brackets to anchor wall members and/or by employing wall members that are angular in plan instead of linear so that one wall member may form one side of a compartment and at least a portion of an adjacent side of the compartment. In all practices of the invention disclosed herein the number of vertical rods required for a horizontal row of N number of tiers of compartments is reduced to 2N+2. Thus, a horizontal row of ten tiers of compartments requires only 22 vertical rods instead of 42 vertical rods.

In the first practice of the invention wall members are employed of the same character as the wall members in the above patent, each of the two opposite side walls of a compartment being formed by a linear wall member incorporating vertical tubes at its opposite ends and the back wall of the compartment being formed by a third wall member also having vertical tubes at its opposite ends. The desired reduction in the number of vertical rods is made possible in this first practice of the invention by employing special brackets each of which has an aperture to engage a vertical rod and each of which has at least one vertical stud spaced from the aperture to engage one end of a vertical tube of a wall member. N compartments require 2N+1 linear wall members, 2N+2 vertical rods, N minus 1 special brackets having two studs each and two additional brackets having one stud each.

Other practices of the invention depend primarily on the use of angular wall members instead of special brackets to reduce the number of required vertical rods. The angular wall members employed in these practices of the invention include L-shaped wall members, T-shaped wall members and U-shaped wall members. In addition, special brackets are employed. The special brackets include brackets each of which is apertured for engagement by a vertical rod and has at least one stud spaced from the aperture to engage a vertical tube of a wall member. The special brackets also include brackets that are not apertured for engagement with vertical rods but instead are provided with pairs of vertical studs to interconnect adjacent ends of wall members.

If only linear wall members are employed, a horizontal row of N number of compartments requires 2N+1 linear wall members or a total of 21 wall horizontal for a horizonrtal row of ten compartments. If angular wall members are employed the number of wall members required for a horizontal row of compartments is drastically reduced, a horizontal row of ten compartments requiring only 11 wall members instead of 21.

If the angular wall members are L-shaped, a horizontal row of ten compartments requires 10 L-shaped wall members plus one linear wall member; if the angular wall members are T-shaped, a horizontal row of 10 compartments requires nine T-shaped wall members plus two linear wall members; and if the angular wall members are U-shaped, a horizontal row of 10 compartments requires ten T-shaped wall members plus one linear wall member. Thus, in each instance where angular wall members are employed N number of compartments requires N+1 wall members.

A further feature of the invention is the provision of marginal slots or notches in the floor panels instead of the usual bores to receive the vertical rods. The result is substantial simplification of the assembly procedure.

The features and advantages of the invention may be understood by reference to the following detailed description and the accompanying drawings.

BRIEF DESCRIPTION OF THE DRAWINGS

In the drawings, which are to be regarded as merely illustrative:

FIG. 1 is a perspective view of a truck equipped with multiple compartments which, as will be explained, may be constructed in various ways within the scope of the invention;

FIG. 2 is an exploded perspective view of a portion of a multiple compartment structure that is fabricated in accord with a first practice of the invention;

FIG. 3 is an enlarged fragmentary vertical section of the structure shown in FIG. 2;

FIG. 4 is a diagrammatic plan view of a compartment of the structure shown in FIG. 2;

FIG. 5 is a perspective view of a special bracket employed in the structure shown in FIG. 2;

FIG. 6 is a perspective view of another special bracket employed in the structure shown in FIG. 2;

FIG. 7 is a perspective view of an L-shaped wall member that is employed in a second practice of the invention;

FIG. 8 is a fragmentary diagrammatic plan view showing how L-shaped wall members such as shown in FIG. 7 are employed to form a compartment;

FIG. 9 is a diagrammatic view showing how the L-shaped wall members of FIG. 7 may be assembled to form a row of compartments;

FIG. 10 is a diagrammatic view showing how T-shaped wall members may be employed in a horizontal row of compartments;

FIG. 11 is a diagram showing how U-shaped wall members may be employed in a horizontal row of compartments; and FIG. 12 is a perspective view of a special bracket that has two vertical studs but no aperture for engagement by a vertical rod.

DESCRIPTION OF SELECTED PRACTICES OF THE INVENTION

FIG. 1 is a perspective view of a multiple compartment structure on a base which in this instance is a truck bed, the structure providing compartments arranged in longitudinal rows and vertical tiers. There are two longitudinal rows of tiers of compartments on the opposite sides, respectively, of the truck with the compartments opening onto the opposite sides of the truck and with each compartment provided with a suitable door. There may be, for example, ten vertical tiers in each row with seven compartments in each vertical tier. The two rows of tiers are spaced apart to provide a central longitudinal aisle or ventilation space 20.

The structure of the first embodiment of the invention is illustrated by FIGS. 2–7. As best shown in FIGS. 2 and 3, the components that are employed to assemble the structure include the following: a plurality of vertical rods 22 extending upright from the truck bed 24; a plurality of floor panels 25 which may be of laminated construction, each floor panel being approximately as wide as a longitudinal row of the compartments; a plurality of side wall members 26 incorporating vertical tubes 27 to provide vertical passages in their opposite ends; a plurality of back wall members 28 also having vertical tubes 29 at their opposite ends; a plurality of door panels 30; a plurality of brackets A (FIG. 5), each of which has an aperture 32 and a single stud 34; a plurality of brackets B (FIG. 6) each of which has an aperture 35 and a pair of studs 36; a plurality of bottom door brackets 38 for use at the bottom of the lowermost layer of compartments; a plurality of top door brackets 40 to be mounted topside the uppermost layer of compartments; a plurality of intermediate door brackets 42 to be mounted at the intermediate floors of the structure; and a plurality of nuts 44 to be screwed onto the upper ends of the various vertical rods 22 to tighten the structure against the truck bed 24. FIG. 3 shows how each of the vertical rods 22 may extend through a corresponding bore 45 in the truck bed 24 into screw threaded engagement with a nut 46 that is welded to the underside of the truck bed.

Referring to FIG. 2, each side wall panel 26 may comprise a plurality of spaced metal bars 48 that interconnect the two metal tubs 27 and in like manner each of the rear wall panels 28 may comprise a plurality of spaced metal bars 50 that interconnect the two metal tubes 29.

Each of the door panels 30 is in the form of a grill of welded construction made of round metal rod stock. Each door has a top horizontal bar 52 (FIG. 2), a bottom horizontal bar 54 and a plurality of intermediate lighter horizontal bars 55 all of which are interconnected by spaced vertical bars 56. The opposite ends of the bottom bars 54 are extended to serve as pivots for pivotal engagement with the door brackets and the opposite ends of the top bars 52 are extended to serve as latch pins for releasable engagement with the door brackets.

Each of the bottom door brackets 38 has a metal loop 62 and a rearwardly extending tongue 64 that is apertured to telescope over an upright rod 22. Each of the top door brackets 40 is formed to provide a hook 65 and a rearwardly extending tongue 66 that is apertured to telescope over an upright rod 22. Each of the intermediate door brackets 42 has both a metal loop 68 and a hook 70 as well as a rearwardly extending tongue 72 that is apertured to telescope over an upright rod 22.

The two opposite extended ends of the lower bars 54 of the doors 30 are loosely captivated by loops of the door brackets and the two opposite extended ends of the top bars 52 of the doors releasably engage corresponding hooks of the door brackets. Thus, as shown in FIG. 3 the extended ends of the bottom bar 54 of a lowermost door panel 30a are captivated by corresponding loops 62 of bottom door brackets 38 and the extended ends of the top bar 52 of the door panel releasably engage corresponding hooks 70 of intermediate door brackets 42. It is apparent that the uppermost door panel 30b, for example, may be opened as indicated in FIG. 3 by first lifting the door panel to lift the extended ends of the top bar 52 of the door panel clear from the corresponding hooks 65 thereby to permit the door panel to be swung outward towards open position with the door panel pivoting about the two loops 68 of an intermediate door bracket 42.

FIG. 2 shows how the components are assembled to form a compartment at one end of a row of tiers. Each tier has four vertical rods 22 at its four corners respectively, and a row of N number of tiers requires 2N+2 rods. A feature of the invention is that each of the horizontal floor panels 25 has four marginal slots or notches 74 instead of four bores to receive the four corresponding vertical rods 22. The marginal notches permit installing a floor panel 25 by tilting the floor panel laterally, moving the tilted floor panel longitudinally between two rows of the vertical rods 22 and then turning the tilted floor panel to horizontal position in engagement with the vertical rods 22. Thus, it is not necessary to lift the floor panels above the top ends of the vertical rods for the purpose of inserting the vertical rods 22 into bores in the floor panels.

In FIG. 2 the four rods for the end tier of the row of tiers are designated respectively 22a, 22b, 22c and 22d.

Each of the two rods 22a and 22b at the front end of a compartment of the tier passes through the aperture in the tongue 64 of a bottom door bracket 38 and then upward through a vertical tube 27 at the forward end of a side wall member 26. The tongues 64 of the bottom brackets 38 serve as spacers between the floor panels 25 and the lower ends of the forward vertical tubes 27 of the side wall members 26 and conventional washers 75 serve as spacers between the upper ends of the forward vertical tubes 27 of a side wall member and the underside of the next higher floor panel 25.

The vertical rod 22c at the right rear corner of the end compartment in FIG. 2 passes through the aperture of a lower bracket A and then through the rear tube 27 of a side wall 26 and above the tube 27 the vertical rod passes through the aperture of a second bracket A. The lower bracket A is positioned upright with its stud 34 telescoped into the lower end of a vertical tube 29 of the rear wall member 28 of the compartment and the upper bracket A is turned upside down with its stud 34 telescoped into the upper end of the same tube 29. Thus, the two brackets A serve as spacers on the vertical rod 22c at the upper and lower ends, respectively, of the vertical tubes 27 and at the same time serve as means to engage the upper and lower ends of vertical tubes 29 to anchor a rear wall member 28.

The fourth vertical rod 22d at the left rear corner of the end compartment extends upward through the aperture of a bracket B and through a vertical tube 27 at the rear end of the corresponding side wall member 26. Above the tube 27 the vertical rod 22d extends through a second bracket B that is positioned upside down. One of the two upwardly extending studs 36 of the lower bracket B telescopes into the lower end of the corresponding end tube 29 of the back wall member 28 of the compartment and the corresponding downwardly extending stud of the upper bracket B telescopes into the upper end of the same tube. The second upwardly extending stud 26 of the lower bracket B telescopes into the lower end of a vertical tube 29 of the rear member 28 of the adjacent compartment and the second downwardly extending stud 36 of the upper bracket B telescopes into the upper end of the same tube. It is apparent that the two brackets B like the two brackets A serve as spacers between ends of tubes of wall members and the adjacent floor panels 25.

The second embodiment of the invention is illustrated by FIGS. 7–9. This embodiment of the invention employs wall members 76 that are L-shaped in plan. Referring to FIG. 8, one leg 76a forms a side wall of a compartment and the other leg 76b forms a rear wall of the compartment. FIG. 9 shows diagrammatically how a row of the L-shaped wall members 76 form a row of compartments with the last compartment of the wall closed by a single linear previously described wall member 26 of the first embodiment of the invention.

Here again, each compartment has four vertical rods at its four corners respectively. At the end compartment of the row the two outer vertical rods 22b and 22c pass through the end tubes of the linear wall member 26.

Each of the L-shaped wall members 76 may be of the simple construction shown in FIG. 7, the structure comprising four metal straps 78 of L-shaped configuration which are welded at their opposite ends to metal tubes 80 and 82 and at the vertex of the wall member are welded to an intermediate metal tube 84. As indicated in FIGS. 8 and 9, the two vertical rods at the left side of each of the compartments of the row pass through the tubes 82 and 84, respectively, of an L-shaped wall member 76 and studs 34 of upper and lower brackets A telescope into the opposite ends of the third tube 80 of the L-shaped wall member. The apertures of the wall brackets A engage a vertical tube 22 at the rear end of each compartment, the brackets serving as spacers as heretofore explained. Door brackets 38 for cooperation with a door panel 30 engage the two forward rods 22 of each compartment. Here again, the number of vertical rods 22 required for a row of N number of tiers is 2N+2. A row of ten compartments requires a total of only 11 wall members, whereas a row of compartments of the first embodiment of the invention requires a total of 21 linear wall members.

FIG. 10 shows how a series of T-shaped wall members 85 may be used to form a row of compartments in cooperation with a special L-shaped wall member 86 at the two opposite ends of the row. Each T-shaped wall member 85 incorporates two vertical tubes 88 and 90 at opposite ends of the stem of the T. In addition, each T-shaped wall member 85 incorporates two vertical tubes 92 at the opposite ends of its two short arms, respectively. The special L-shaped wall member 86 at the end of the row incorporates two metal tubes 94 and 95 at opposite ends of its long leg and incorporates a third metal tube 96 at the end of its short leg.

At each end compartment of the row of compartments upper and lower brackets C are employed of the construction shown in FIG. 12. Each bracket C has a pair of studs 98 which telescope into the upper and lower ends of the vertical tubes 92 and 96, respectively, to link the short leg of a T-shaped wall member 85 with the short leg of the special L-shaped wall member 86.

In the rest of the compartments of the row, upper and lower brackets C link together the confronting short legs of T-shaped wall members 85. A row of 10 compartments requires 9 T-shaped wall members 85 plus two L-shaped wall members 86, making a total of 11 wall members. Previously described door panels 30 close the front ends of the compartments.

FIG. 11 shows diagrammatically how wall members 100 that are U-shaped in plan may be employed for a row of compartments with a linear wall member 26 at one end of the row. Each U-shaped wall member 100 has a central wall panel 102 and two parallel wall panels 103 and 104 perpendicular to the central wall panel. Each of the U-shaped wall members incorporates two intermediate vertical tubes 105 and 106 at the opposite ends, respectively, of its central panel 102 plus two additional vertical tubes 107 and 108 at the ends of its two parallel panels 103 and 104, respectively. Each front panel 104 incorporates a suitable conventional door 110 which need not be described.

At the end compartment of the row, a previously described linear wall member 26 is mounted at its opposite ends on two vertical rods 22 and studs 34 of upper and lower brackets A on the two vertical rods telescope into the upper and lower ends of the tubes 107 and 108 of the parallel panels to link the parallel panels to the two vertical rods. In each compartment a U-shaped wall member 100 is mounted by its vertical tubes 105 and 106 on corresponding vertical rods 22, and the parallel panels 103 and 104 of the U-shaped wall member are linked to vertical rods 22 by brackets A with the studs 34 of the brackets telescoped into the upper and lower ends of the tubes 107 and 108 of the parallel panels. It is apparent that a row of ten compartments requires a total of 11 wall members.

My detailed description of the selected embodiments of the invention will suggest various changes, substitutions and other departures from my disclosure within the spirit and scope of the appended claims.

I claim:

1. A structure forming a plurality of layers of compartments arranged in vertical tiers and supported on an underlying base, comprising:
    a first wall member and a second wall member for each compartment of a tier cooperative to form at least the two opposite side walls and the rear wall of the compartment,
    at least one of said wall members forming an angle in plan configuration, one leg of the angle forming one side wall of the compartment, the other leg of the angle forming at least part of the rear wall of the compartment,
    each of said wall members having two horizontally spaced upright passages therethrough;
    a plurality of horizontal panels forming floors and ceilings of the compartments; and
    a group of four rods in each tier extending upward from said base through the horizontal panels,
    said four rods including two rods extending through the two upright passages of the first wall members of the tier and two rods extending through the upright passages of the second wall members of the tier to hold the wall members in their assembled positions.

2. A combination as set forth in claim 1 in which an end of one panel of the two wall members of a compartment terminates adjacent a vertical rod that passes through a vertical passage of the other of the two wall members of the compartment;
    and which includes means connecting said end of the panel to said vertical rod.

3. A combination as set forth in claim 2 in which said connecting means has a relatively thin wall with an aperture therein receiving said vertical rod.

4. A combination as set forth in claim 2 in which said connecting means has a stud that telescopes into a vertical passage at said end of a panel.

5. In a structure forming a plurality of layers of compartments, each compartment having side walls and a rear wall, the compartments being arranged in vertical tiers and supported on an underlying base, the structure including a plurality of horizontal panels forming the floors and ceilings of the compartments with wall members spacing the horizontal panels apart and supporting the ceiling panels, said wall members forming side walls and rear walls of the compartments, said wall members having vertical passages therethrough, and wherein a plurality of rods extend upward from the base through the horizontal panels and the passages of the wall members to hold the horizontal panels and wall members in place,
    the improvement to reduce the required number of vertical rods, comprising:
    the provision of a plurality of brackets, each of the brackets being linked with a particular rod that passes through a vertical passage of a particular wall member,
    the bracket engaging a wall member other than the particular wall member so that both said particular wall member and said other than the particular wall member are anchored by the particular vertical rod,
    said wall member other than the particular wall member having a given vertical passage therethrough and a portion of the bracket telescoping into said given passage to effectuate the engagement of said bracket and said wall member other than the particular wall member.

6. In a structure forming a plurality of layers of compartments, each compartment having side walls and a rear wall, the compartments being arranged in vertical tiers and supported on an underlying base, the structure including a plurality of horizontal panels forming the floors and ceilings of the compartments with wall members spacing the horizontal panels apart and supporting the ceiling panels, said wall members forming side walls and rear walls of the compartments, said wall members having vertical passages therethrough, and wherein a plurality of rods extend upward from the base through the horizontal panels and the passages of the wall members to hold the horizontal panels and wall members in place,
    the improvement to reduce the required number of vertical rods, comprising:
    the provision of a plurality of brackets, each of the brackets being linked with a particular rod that passes through a vertical passage of a particular wall member,
    each bracket engaging two wall members other than the particular wall member so that said particular wall member and both of said two wall members other than said particular wall member are anchored by the particular rod, said two wall members other than the particular wall member having vertical passages therethrough and two different portions of the bracket engaging said two vertical passages.

* * * * *